United States Patent [19]

Wold et al.

[11] Patent Number: 5,640,562

[45] Date of Patent: Jun. 17, 1997

[54] LAYERING HARDWARE SUPPORT CODE ON TOP OF AN EXISTING OPERATING SYSTEM

[75] Inventors: Saul G. Wold, Los Gatos; Gary L. Owens, Mountain View, both of Calif.

[73] Assignee: Sun Microsystems, Inc., Mountain View, Calif.

[21] Appl. No.: 394,859

[22] Filed: Feb. 27, 1995

[51] Int. Cl.$^6$ .................................................. G06F 13/00
[52] U.S. Cl. .............................................................. 395/652
[58] Field of Search ................................................ 395/700

[56] References Cited

U.S. PATENT DOCUMENTS

| | | | |
|---|---|---|---|
| 5,325,532 | 6/1994 | Crosswy et al. | 395/700 |
| 5,430,845 | 7/1995 | Rimmer et al. | 395/700 |
| 5,459,867 | 10/1995 | Adams et al. | 395/700 |
| 5,504,904 | 4/1996 | Dayan et al. | 395/700 |

Primary Examiner—Kevin A. Kriess
Assistant Examiner—John Q. Chavis
Attorney, Agent, or Firm—Timothy J. Crean

[57] ABSTRACT

An embodiment of the present invention provides an efficient and robust way to incorporate new installation scripts into an existing operating system in order to install and reboot a system using a new platform specific kernel and new device specific drivers. The embodiment determines the platform architecture of the system and stores it in an address space of an existing operating system kernel. The embodiment also pre-processes a file with dynamic entries in order to generate device independent package names. If the platform architecture type stored in each package matches the platform architecture type stored in the kernel address space then the file system is used to install the files from the package onto the system. The existing operating system then reboots the system using the installed platform specific kernel.

16 Claims, 9 Drawing Sheets

```
METACLUSTER = VALUE
    CLUSTER = VALUE
            PACKAGE = VALUE
                .
                .
                .
            PACKAGE = VALUE
            END
    END
        .
        .
        .
    CLUSTER = VALUE
            .
            .
            .
        END
END
    .
    .
    .
METACLUSTER = VALUE
    .
    .
    .
END
```

NEW_PARAMETER = (<TEST><ARGUMENT>)<PARAMETER>

LAYERING HARDWARE SUPPORT CODE ON TOP OF AN EXISTING OPERATING SYSTEM

BACKGROUND OF THE INVENTION

1. Field of the Invention

The present invention relates to the field of operating systems, and, more specifically, to incorporating into an existing operating system, installation code to install previously unsupported platform specific kernels and device specific drivers.

2. Background of the Invention

When a user flips a computer's ON switch the computer begins a process known as the system boot. The system boot process on most machines consists of the following basic steps. First the system firmware in the programmable read-only memory ("PROM") runs a power-on self-test ("POST") to ensure that all hardware components are functioning properly. If the POST test completes successfully then a boot block is read from a permanent memory area (e.g., a disk drive) on the computer. When booting to install a new system, the boot block typically instructs the computer to search a CD-ROM drive or a disk drive for an operating system kernel. The operating system kernel is the core of the operating system. The kernel contains the most essential operating system services, such as task schedulers and interrupt handlers. When the operating system kernel files are found they are read into the computer's random access memory ("RAM") and control is transferred to the kernel. The operating system then takes on the more complicated tasks that the boot block code cannot manage. For example, the operating system mounts the necessary file-systems and loads input/output ("I/O") routines. One of the masons for loading the operating system from a CD-ROM drive or disk drive and not pre-installing the operating system is to allow users a choice of which operating system to load and use.

One of the more important functions that the operating system kernel performs during system boot is installation of device specific drivers. A driver is a program that serves as an interface between two programs or between a program and a hardware component. For example, to ensure that a network interface card will work with a particular network software package, drivers are used. To install means to set up and prepare for operation. Therefore, to install device drivers means to set up and prepare the device drivers to work with the computer and its device. Installing device specific drivers to operate the hardware components of a computer has been customary since the advent of personal computers and workstations. Device specific drivers are not typically pre-installed because computers are general purpose machines designed and developed to work with a myriad of different hardware components to accomplish thousands of different functions. Due to limitations in memory capacity it is impractical to load each and every device driver that could possibly be invoked by the system. Instead, the computer determines which hardware components are actually connected to the system, often through a "dialog" with a systems administrator, and then loads the device drivers for those hardware components.

Typically, the responsibility to develop device specific drivers falls to the manufacturer of the device. Responsibility to develop platform specific kernels fails primarily to operating system developers. Finally, responsibility to develop code to install device specific drivers and platform specific kernels falls to developers of operating systems.

Since the resources of any given operating system developer are not limitless, they cannot develop kernels to support each and every platform on the market. They also cannot develop installation code to install all possible device drivers. Therefore, any given version (called a "base version") of an operating system only includes installation code to install a limited number of kernels and drivers.

A problem arises when original equipment manufacturers ("OEMs") develop new computer systems which are not supported by the base version of the operating system. A user of the new computer system, running the base version of the operating system, will not be able to access unsupported hardware components because the operating system never installs a platform specific kernel and device specific drivers which can recognize and handle application program calls to the new hardware. Being unable to communicate with some of the components of your system can cause serious problems. For example, if the unsupported hardware component is the user's current keyboard then the user will be unable to enter data into the system.

In the past, operating system developers and OEMs have tried to solve this problem in a number of different ways. For example, some operating system developers transfer to each OEM a copy of the source code for the base version of the operating system. The OEM then modifies the source code to create a new kernel with some new device drivers which together accept requests from application programs and translate those requests into a language which the (previously) unsupported hardware component can understand. The OEM then transfers the modified operating system onto a compact disc and offers the new CD for sale. One of the problems with this approach is that a user of the operating system needs to purchase separate CDs from separate sources in order to have copies of the operating system which execute on the different hardware systems available in the market.

In addition to having the problem of separate CDs, a user, who is not generally interested in the procedural and administrative details of installing additional kernels, must nonetheless struggle with the various installation procedures from different OEMs. Thus a need exists to supply a consistent installation procedure across various kernels.

SUMMARY OF THE INVENTION

A preferred embodiment of the present invention incorporates new installation scripts into the installation process of an existing operating system in order to install new computer specific kernels and device specific drivers on a new computer. To begin the process the preferred embodiment boots the new computer using an existing operating system kernel. The existing operating system kernel determines a computer architecture type of the new computer and stores the architecture type in a kernel address space. Then the existing operating system kernel inserts into a first file, references to files comprising the new computer specific kernel, as well as information regarding a computer architecture type on which to install the new computer specific kernel. Next, the existing operating system kernel retrieves the computer architecture type from the first file and compares the retrieved computer architecture type with the determined computer architecture type. When the computer architecture types match, the existing operating system kernel installs the files comprising the new computer specific kernel. In response to the installation, the existing operating system kernel reboots the new computer from the new computer specific kernel.

DESCRIPTION OF THE DRAWINGS

The objects, features and advantages of the system of the present invention will be apparent from the following description in which.

DESCRIPTION OF THE PREFERRED EMBODIMENT

The preferred embodiment of the present invention provides a method and system for incorporating new installation scripts into an existing operating system in order to install new platform specific kernels and device specific drivers onto a new platform. The preferred embodiment addresses the situation where an OEM develops new platform specific kernels and device specific drivers to support a previously unsupported platform. For example, when an OEM develops a new platform it may contain a new keyboard and a new disk drive. Therefore, the OEM develops a new keyboard driver, a new disk driver, and modifies the existing operating system kernel to use the new drivers. The new drivers and the modified operating system are together known as a new "package." The preferred embodiment of the present invention, in conjunction with an existing installation program, executes the new installation scripts to install the new package onto the new platform. Once installed the new platform can be rebooted from the new platform specific kernel.

Figure 1:
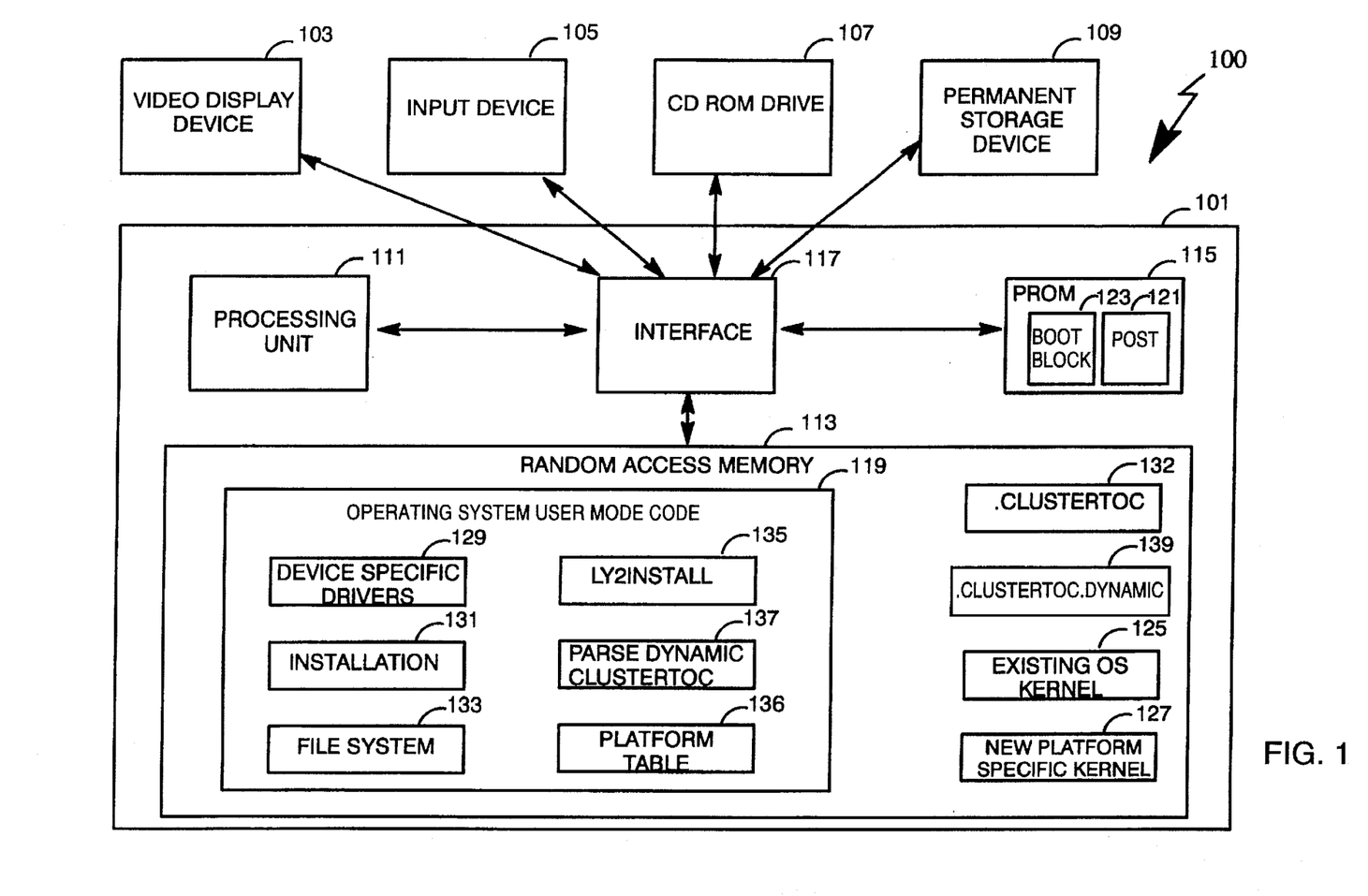
FIG. 1 is a block diagram of a computer system for practicing a preferred embodiment of the present invention.

FIG. 1 is a block diagram of a computer system 100 for practicing the preferred embodiment of the present invention. The computer system 100 includes a computer 101, a video display device 103, an input device 105, such as a keyboard, mouse, or pointing device, a CD-ROM drive 107, and a permanent storage device 109, such as a disk drive.

The computer 101 includes a processing unit 111, a random access memory ("RAM") 113, a programmable read-only memory ("PROM") 115, and an interface 117 for enabling communication between the processing unit 111 and the RAM 113 or the PROM 115. The interface 117 also facilitates communication between the processing unit 111 and peripheral devices (e.g., the video display device 103, the input device 105, and the CD-ROM drive 107).

The computer memory 113 holds a number of items, including an operating system 119 that is responsible for controlling the allocation and usage of the hardware resources of the system, such as memory 113, processing unit 111, and CD-ROM drive 107. The preferred operating system is the Solaris® operating system from Sun Microsystems, Inc.® of Mountain View, Calif. (Solaris, Sun, and Sun Microsystems are registered trademarks of Sun Microsystems, Inc.) The remaining components of the RAM 113 and the operating system 119 are perhaps best described by way of example.

The process which leads to execution of the preferred embodiment begins when an OEM develops a new platform that includes new hardware components that need to be accessed or installed when booting the new platform. As part of the platform development process the OEM ports an existing operating system to the new platform. When the development process is complete the OEM converts the modified operating system into an agreed upon format, stores the package in a named directory on a storage medium, and delivers it to the operating system developer.

The operating system developer runs the modified operating system through its standard testing procedure. If the modified operating system passes the tests then it is incorporated into the existing operating system and a user is permitted to install the new package onto the new platform using the preferred embodiment of the present invention.

Figure 2:
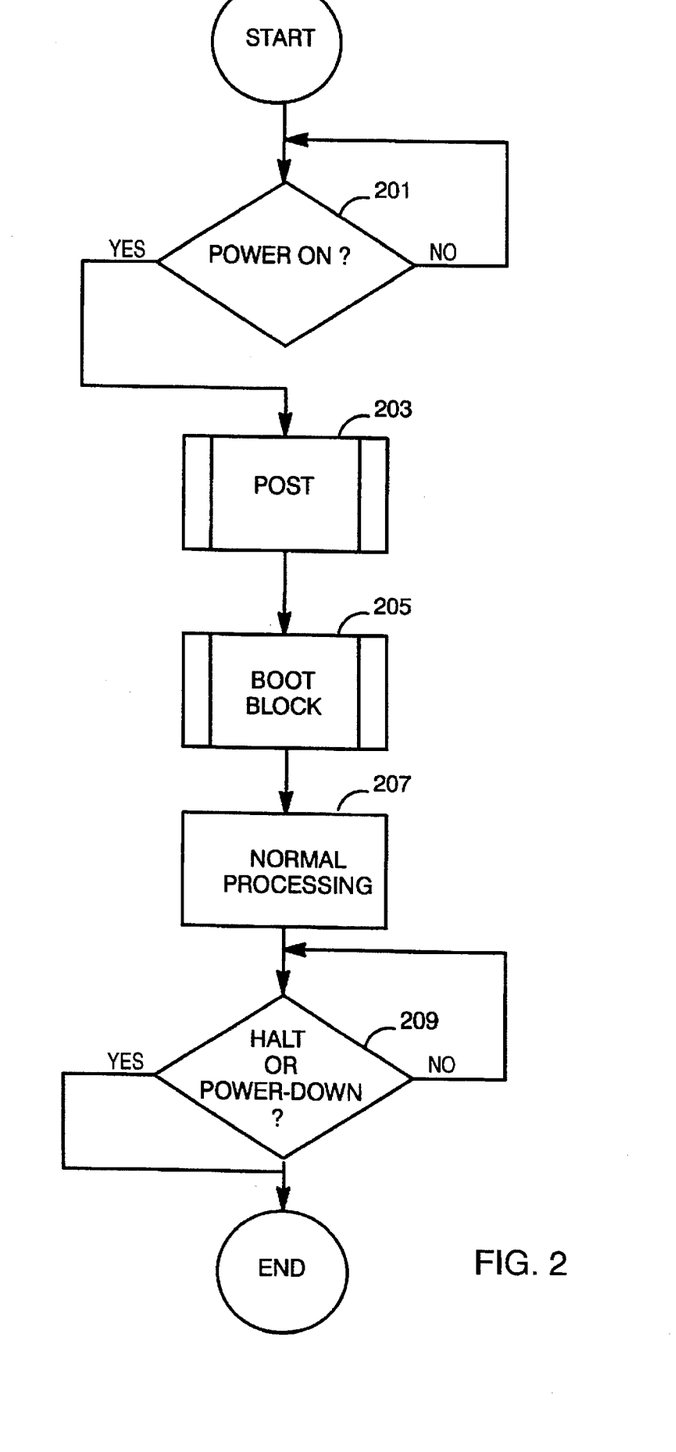
FIG. 2 is a diagram of the computer system operation from the time a user rams the computer "on" to the time the user enters a "halt" or "power-down" request.

FIGS. 2–6 and 9 are flow diagrams that illustrate an operation of the preferred embodiment on the computer system of FIG. 1. In particular, FIG. 2 is a flow diagram of the system operation from the time a user turns the computer "on" to the time the user enters a "halt" or "power-down" request. In step 201 the system awaits power. Upon initiation of power the power-on self-test ("POST") 121 (FIG. 1) is executed in step 203. The POST routine makes sure that all the hardware components are running and that the processing unit 111 and the RAM 113 are functioning properly. Upon successful return from the POST routine, the boot block 123 (FIG. 1) is executed (step 205). The boot block routine loads an existing operating system kernel 125 which initiates the preferred installation and reboot process of the present invention. Once the computer 101 has been rebooted from a new platform specific kernel 127, normal processing continues (step 207) until the user enters a system halt or power-down request (step 209).

Figure 3:
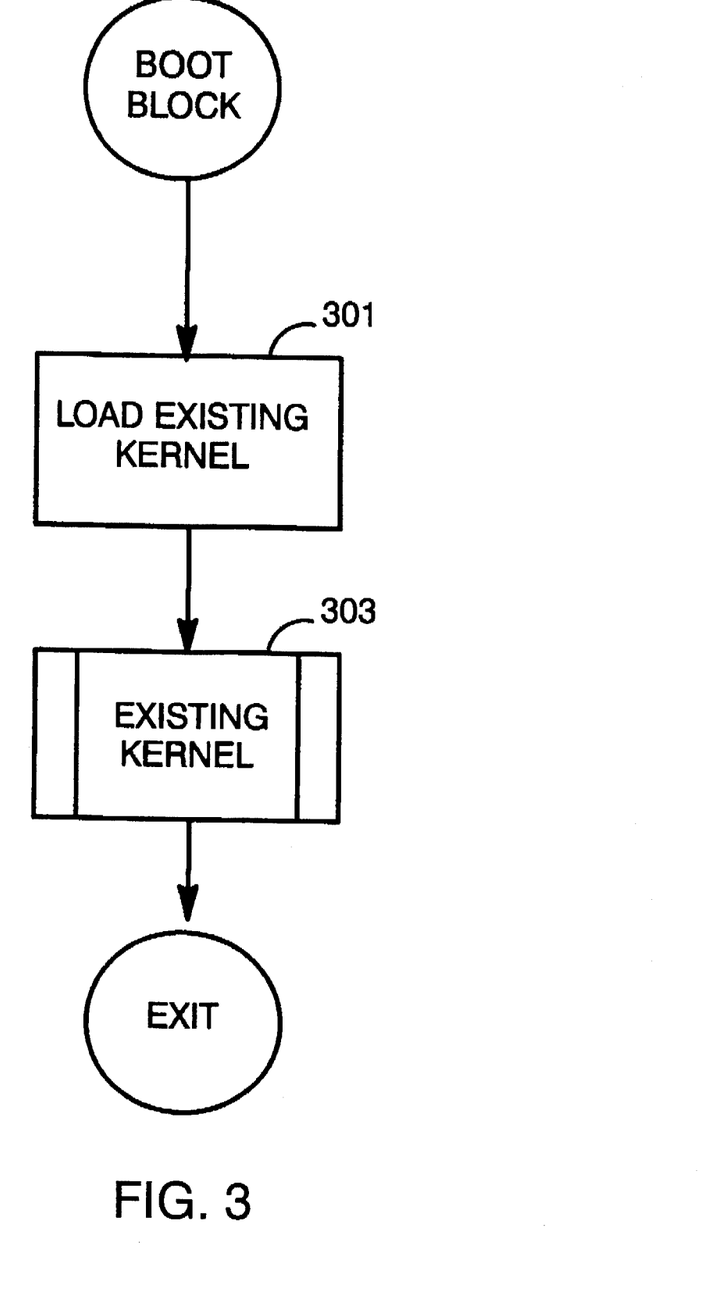
FIG. 3 is a flow diagram of a boot block routine for initiating a preferred system boot process.

FIG. 3 is a flow diagram of the boot block 123 for initiating the preferred system boot process. The preferred boot block routine loads and invokes an existing operating system kernel 125 (steps 301 and 303). Upon return from executing the existing operating system kernel routine, the new platform specific kernel 127 is executing on the processing unit 111. Therefore, while the ultimate goal of the preferred embodiment is to reboot the computer 101 with the new platform specific kernel 127, an existing operating system routine must fast be executed long enough to install and invoke the new platform specific kernel.

Figure 4:
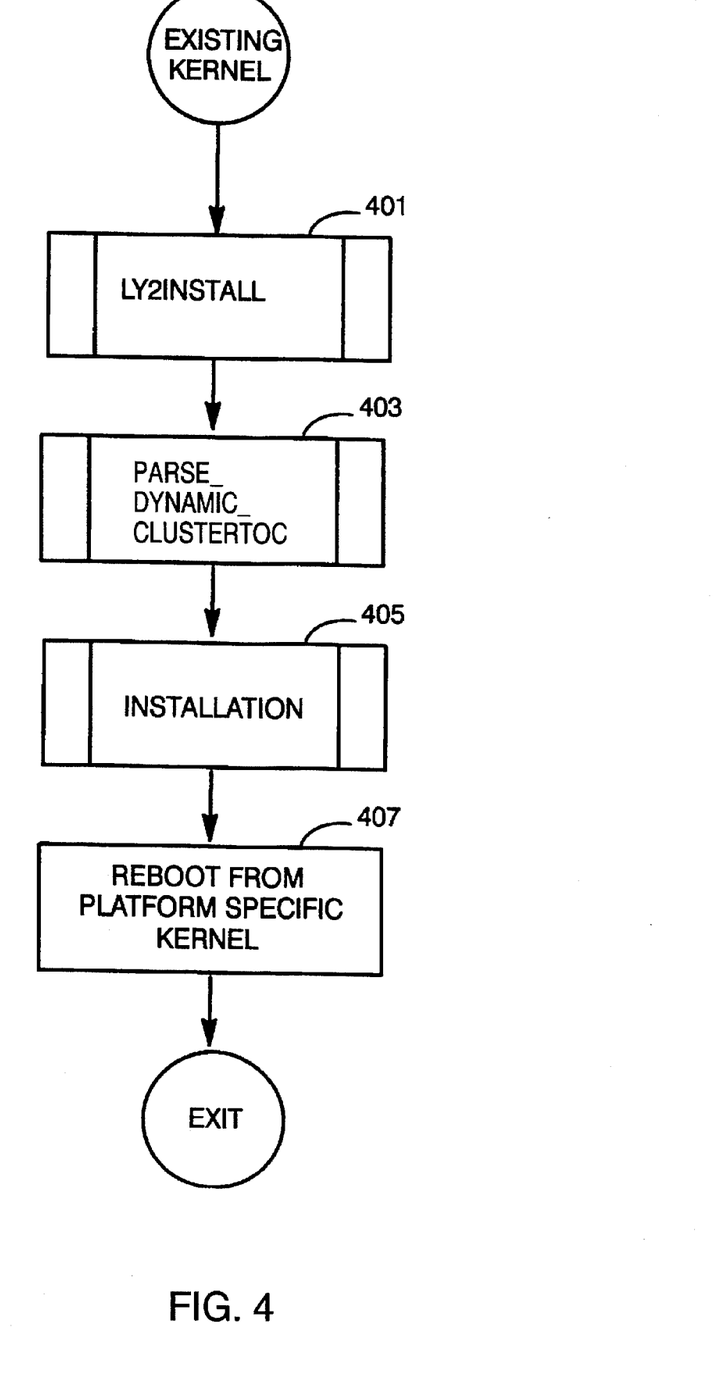
FIG. 4 is a diagram for operation of an existing operating system kernel routine which installs an appropriate platform specific kernel and device specific drivers and then reboots the computer with platform specific kernel.

FIG. 4 is a flow diagram for the existing operating system kernel 125 (FIG. 1) which installs the appropriate platform specific kernel and device specific drivers and then reboots the computer with the platform specific kernel. For purposes of clarity, FIG. 4 only contains those steps preferably taken to perform a new system installation. Those of ordinary skill will understand that existing operating system kernels perform a number of tasks in addition to those illustrated in FIG. 4. For example, the existing operating system kernel 127 may also be capable of performing a system boot from disk. In that case the existing kernel accesses files previously installed on the disk (during a new system installation boot) and boots the system from those files.

Steps 401, 403, and 405 work together to install the platform specific kernel 127 and the device specific drivers 129 onto the system 100. The ly2install script 135 is one of the new additions of the present invention. In step 401, the Ly2install script determines the platform name of the computer platform 101 and then maps the platform name to its appropriate platform architecture type. The parse_dynamic_clustertoc script 137 is another new addition of the present invention. The parse_dynamic_clustertoc script, invoked in step 403, generates a file named ".clustertoc" 132 which contains device independent package names. The installation routine 131, invoked in step 405, then uses the platform architecture information, along with the device independent package names, to install the platform specific kernel 127 and the device specific drivers 129 onto the system 100. Upon return from the installation routine, the new platform specific kernel 127 resides on the permanent storage device 109. The existing kernel routine 125 then reboots the computer 101 using the new platform specific kernel 127 (step 409).

Figure 5:
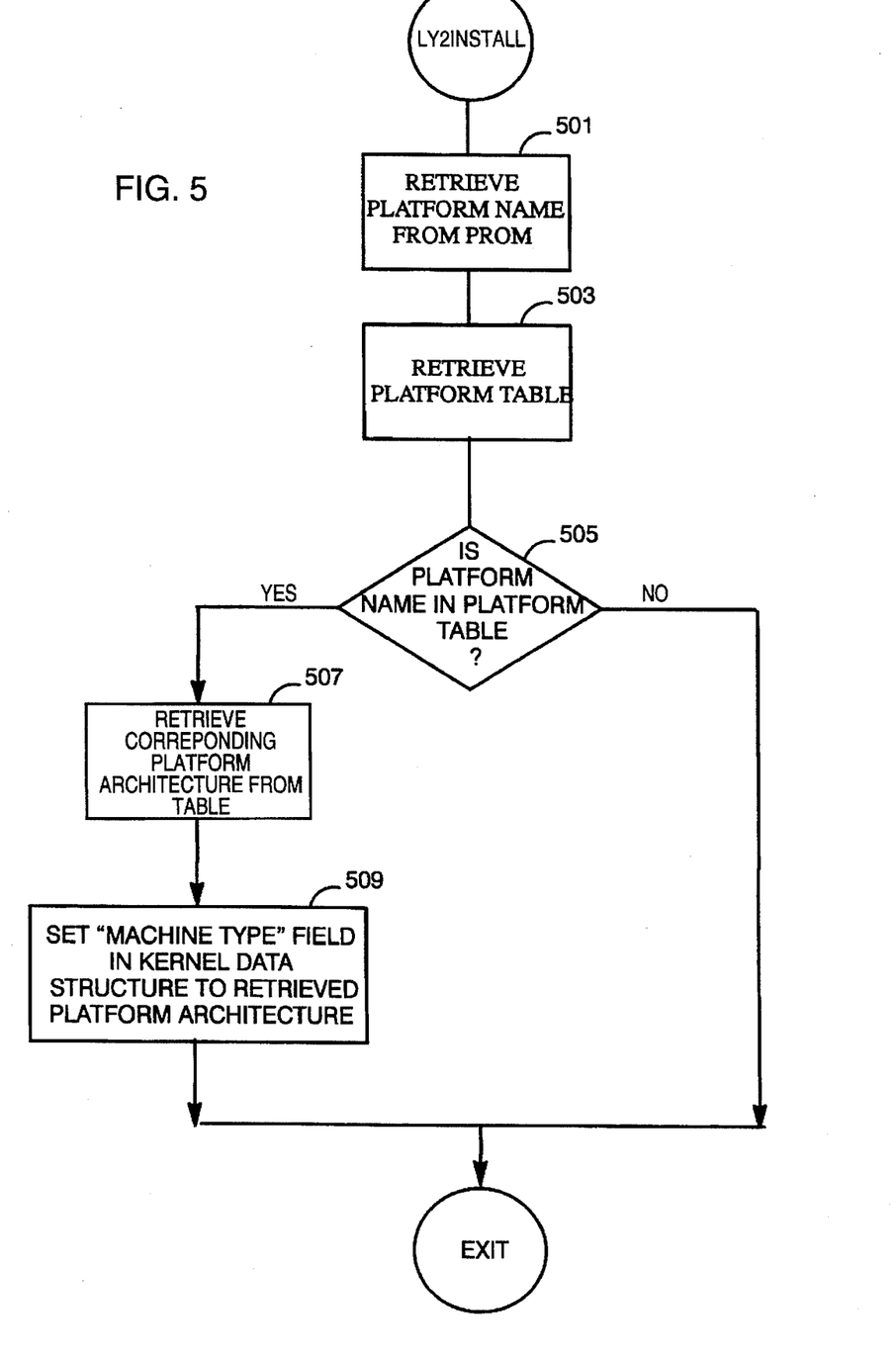
FIG. 5 is a flow diagram of a ly2install script which provides information that the installation routines uses to determine which files to install on the computer system.

FIG. 5 is a flow diagram of the ly2install script 135 which provides information that the installation routine 131 uses to determine which files to install on the system 100. In step 501 the ly2install script retrieves, preferably from the PROM 115, the platform name of the computer 101. In the preferred embodiment the platform name is stored in a root node of the PROM 115 by the OEM which developed the system 100. The platform name is preferably retrieved using the Unix command "prtconf." The prtconf command retrieves system configuration information. The information includes the platform name, the total memory space, and the configuration of the system peripherals formatted as a device tree. In step 503 the ly2install script retrieves a platform table 136 from the CD ROM drive 107 so that the platform name can be mapped to an appropriate platform architecture type. In the preferred embodiment the operating system developer maintains the platform table 136. In step 505, the ly2install script determines whether the platform name is stored in the platform table. If it is not stored in the table then the ly2install script ends processing. If the platform name is in the platform table then steps 507 and 509 are performed. In step 507, the ly2install script retrieves the appropriate platform architecture type from the table. In step 509, the ly2install script sets the "machine type" field in the existing kernel 125 to the retrieved platform architecture type. In the preferred embodiment the "adb" command is used to set the "machine type" field in the kernel. Adb is a general purpose debugger. A debugger like adb is preferred because the ly2install script runs in the user mode address space of the operating system while the kernel data structure resides in a supervisor virtual address space. Routines which run in the user space are not permitted to modify the kernel, so an indirect method of kernel modification is needed. Because adb runs in the same supervisor address space as the kernel, it can modify the kernel data structure.

Figure 6:
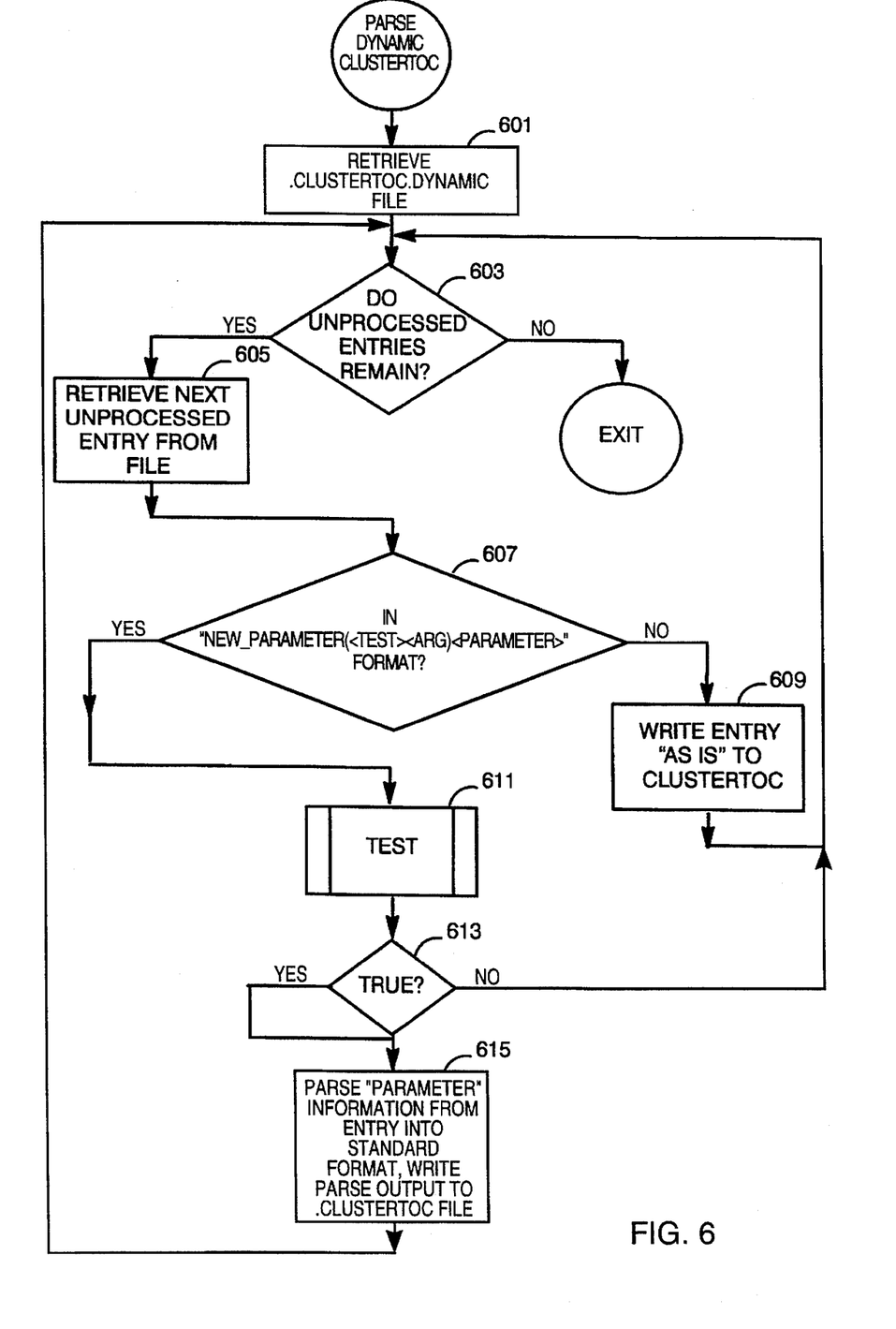
FIG. 6 is a flow diagram of a parse_dynamic_clustertoc routine which pre-processes a file named ".clustertoc.dynamic" in order to insert device independent package names into a file named ".clustertoc".

FIG. 6 is a flow diagram of the parse_dynamic_clustertoc routine 137 which pre-processes a file named ".clustertoc.dynamic" 139 in order to generate the ".clustertoc" file 132. The ".clustertoc" file 132 contains device independent package names. The creation of the ".clustertoc.dynamic" file 139 is yet another of the new additions provided by the present invention. Before discussing either the format of the ".clustertoc.dynamic" file 139 or the preferred method for pre-processing the ".clustertoc.dynamic" file 139, it will be helpful to understand the format of the ".clustertoc" file 132. This is so because the ".clustertoc.dynamic" file 139 is conceptually a superset of the ".clustertoc" file 132. Therefore, the differences between the two files (i.e., the preferred additions provided by the developers of the present invention) will be more easily recognized once the existing format of the ".clustertoc" file 132 is understood.

Figure 7:
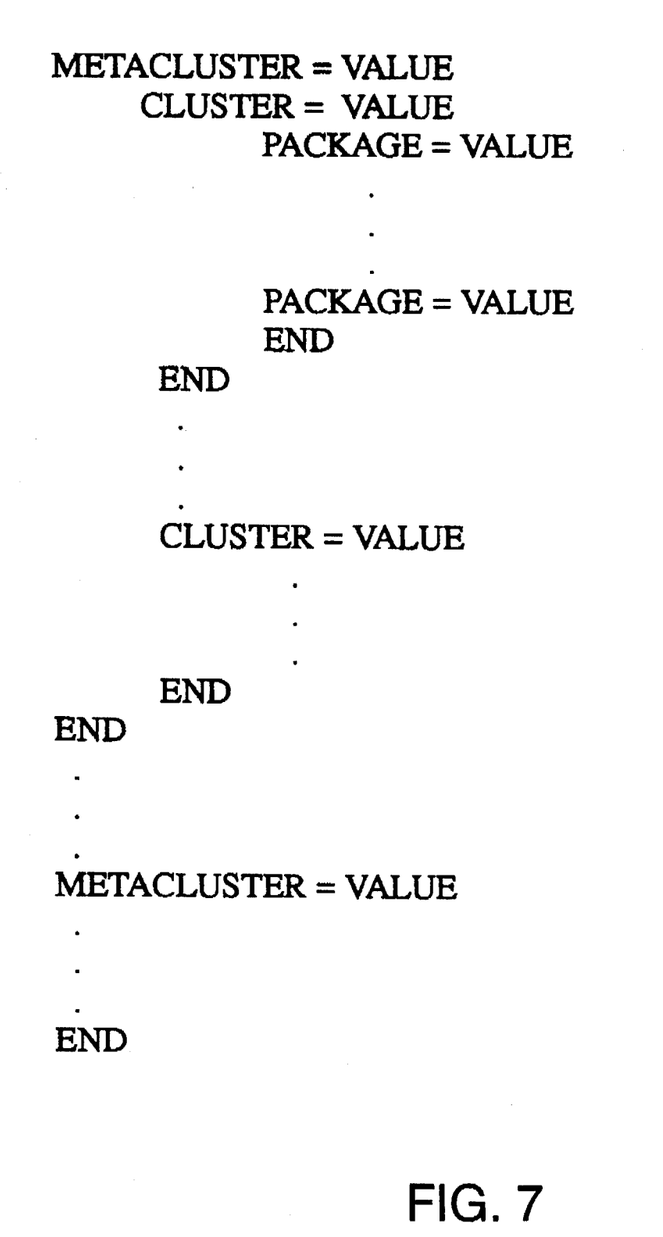
FIG. 7 illustrates a typical ".clustertoc" file.

FIG. 7 illustrates a typical ".clustertoc" file 132. The ".clustertoc" file 132 is preferably an ASCII file that describes a hierarchical view of a software product. The ".clustertoc" file 132 preferably resides in the top-level directory containing the product.

The hierarchy described by the ".clustertoc" file 132 can be of arbitrary depth, although the preferred installation routine 131 assumes that it has three levels. The hierarchy is described herein in a bottom-up manner. The "lowest" level in the hierarchy is a "package" which can be thought of as a grouping of logically related files. The next level in the hierarchy is the "cluster" which collects packages into functional units. The highest level is the "meta-cluster" which collects packages and clusters together into typical configurations. A typical cluster may include packages provided by an OEM of the computer. A typical meta-cluster may include the minimum packages required to boot and configure the operating system to the point of running a multi-user shell or it may contain the software packages most often used by an end-user of the operating system.

The hierarchy exists to facilitate the selection or deselection of software for installation at varying levels of granularity. Interacting at the package level provides the finest level of control over what software is to be installed. Interacting at the meta-cluster level provides the coarsest level of control.

As FIG. 7 illustrates, each entry in the ".clustertoc" file 132 is a line that establishes the value of a parameter in the following form: "parameter=value." Parameters are grouped by cluster or meta-cluster. The start of a cluster description is defined by a line of the form: "cluster=value." Likewise, the start of a meta-cluster description is defined by a line of the form: "meta-cluster=value." Each cluster or meta-cluster description is preferably terminated by an "END."

The installation routine 131 retrieves the meta-cluster, cluster, and package names and presents them on a user interface to the systems administrator performing the installation. The systems administrator selects one meta-cluster, and within that meta-cluster, selects or deselects multiple clusters, and/or packages. The installation routine then installs the selected packages on the system. Previous versions of the installation routine expected the ".clustertoc" file 132 to describe four required meta-clusters for the base operating system product. The meta-cluster "SUNWCall" contains all of the software packages in the operating system distribution from the operating system developer. The meta-cluster "SUNWCuser" contains the typical software packages for an end-user of the operating system distribution. Finally, the meta-cluster "SUNWCreq" contains the bare-minimum packages required to boot and configure the operating system to the point of running a multi-user shell.

Figure 8:
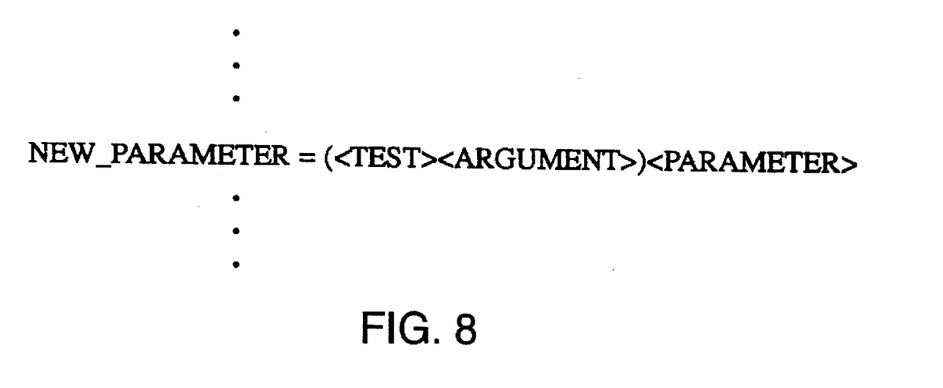
FIG. 8 illustrates a preferred format for the ".clustertoc.dynamic file."

FIG. 8 illustrates a preferred format for the ".clustertoc.dynamic" file 139. The ".clustertoc.dynamic" file 139 is conceptually a superset of the ".clustertoc" file 132 because it contains each and every entry that will be found in the ".clustertoc" file 132. In addition, the ".clustertoc.dynamic" file 139 contains a new type of entry of the format "new-parameter=(<test><test argument>)<parameter>." The purpose of the new type of entry is perhaps best described by way of example.

As was discussed above, the "Parse-Dynamic_Clustertoc" routine pre-processes the ".clustertoc.dynamic"

file 139 and generates the ".clustertoc" file 132. In general, the "Parse-Dynamic_Clustertoc" routine reads each entry in the ".clustertoc.dynamic" file 139 (steps 601–605) and when it encounters an entry of the type "meta-cluster=____" or "cluster=____" or "package=____" it merely writes the entry "as is" to the ".clustertoc" file 132 (step 609).

When the "Parse-Dynamic_Clustertoc" routine encounters an entry of the type "new-parameter=(<test><test argument>)<parameter>" (step 607) it runs the "test" using the "test argument" (step 611) and if the result of the test is "True" (step 613) then it parses the "parameter" information from the entry into the standard format and writes the parse output to the ".clustertoc" file 132 (step 615). If the result of the test is "False" then the "parameter" information from the entry is not written to the ".clustertoc" file 132. For example, the preferred embodiment may use a "platform" test with the name of the new platform as the test argument. If the result of the test comes back "True" then entries for the meta-clusters, clusters, and packages of the device specific drivers for that platform would be written to the ".clustertoc" file 132 for later installation.

Figure 9:
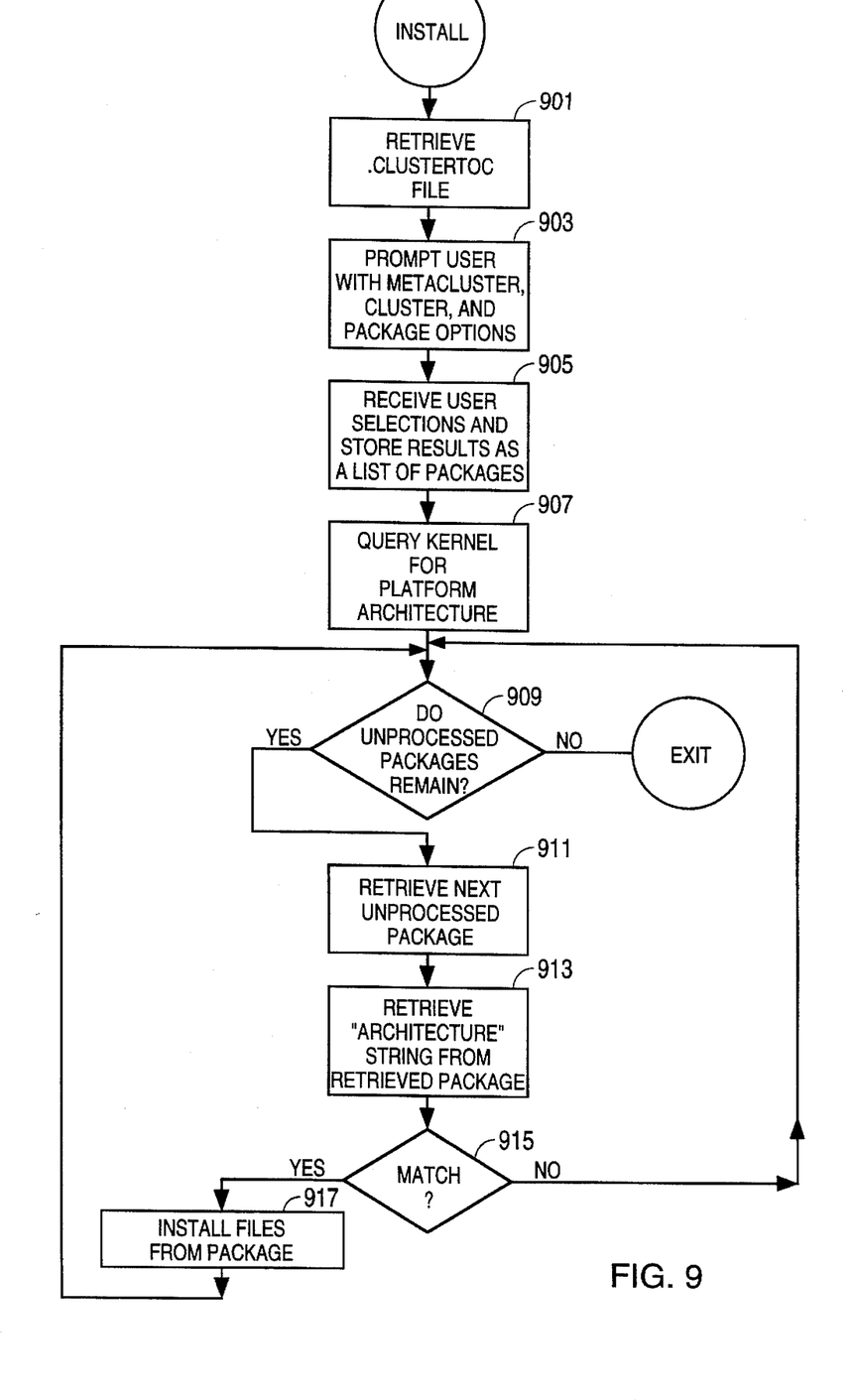
FIG. 9 a flow diagram of the installation routine which installs files onto a system disk.

FIG. 9 is a flow diagram of the installation routine 131 which installs files onto the permanent storage device 109. In step 901, the installation routine retrieves the ".clustertoc" file 132. In step 903, the installation routine retrieves the meta-cluster, cluster, and package names from the ".clustertoc" file 132 and presents them on a user interface to the systems administrator performing the installation. Previous versions of the installation routine 131 expected the ".clustertoc" file 132 to describe four required meta-clusters for the base operating system product. The meta-cluster "SUNWCall" contains all of the software packages in the operating system distribution from the operating system developer. The meta-cluster "SUNWCuser" contains the typical software packages for an end-user of the operating system distribution. The meta-cluster "SUNWCprog" contains the typical software packages for a programmer. For example, the "SUNWCprog" meta-cluster typically contains header files, debuggers, and compilers. Finally, the meta-cluster "SUNWCreq" contains the bare-minimum packages required to boot and configure the operating system to the point of running a multi-user shell. The preferred embodiment of the present invention provides a fifth meta-cluster named "SUNWCXall." The "SUNWCXall" meta-cluster contains all of the software packages in the operating system distribution from the operating system developer and, in addition, it contains all of the new software packages from the OEMs. Given these options, the systems administrator selects a certain meta-cluster, and within the selected meta-cluster, certain clusters, and/or packages. The installation routine stores the results as a list of packages (step 905). In step 907, the installation routine queries the existing kernel 125 for the platform architecture of the computer 101. For each package (steps 909 and 911), the installation routine compares the "architecture" string stored in the package (step 913) with the "platform architecture type" retrieved from the kernel (step 915). Preferably, all packages are stored in a known directory on the CD ROM drive 107. Therefore, the installation routine accesses the known directory, finds the "architecture=____" swing and then performs its comparison. If no match occurs then processing continues with step 909. If a match does occur then the installation routine invokes the file system 133 to install the package on the system (step 917).

If all packages have been processed then processing ends in the installation routine. Processing continues, however, at step 407 (FIG. 4) of the existing kernel routine 125. In step 407 the existing kernel routine reboots the system 100 from the platform specific kernel 127. Upon completion of the reboot, processing ceases in the existing kernel routine. Processing continues, however, in the platform specific kernel 127 (step 207 of FIG. 2) until the user enters a "halt" or "power-down" request (step 209).

The method and system of the preferred embodiment, as described above, provides a number of benefits and advantages. By primarily modifying the underlying state data while leaving the existing installation code relatively intact, the preferred embodiment satisfies the, at times conflicting, requirements of OEMs, independent software vendors (ISVs), and end-users.

The ISVs do not want the code in the base version of the operating system to be disturbed because the ISVs have previously expended their own resources to develop application programs which work with the base version of the operating system. The ISVs would like to continue to run their applications on the base version of the operating system, and would like to avoid being forced to expend additional resources to develop new application code which operates on the modified operating system. The operating system developer would like to protect the investment of its ISVs so that in the future the ISVs will continue to port their applications to the operating system developer's operating system. By keeping the existing installation code intact the needs of the ISVs are met.

At the same time the operating system developer would like to support the new computer systems of the OEMs because such systems increase the potential market for the operating system developer's product. By providing the new installation scripts the needs of the OEMs are met.

Finally, the operating system developer would like to offer these different versions of its operating system on one set of compact disks so that users of the operating system can avoid buying a separate CD and learning a new installation procedure for each new system developed by an OEM. By incorporating the installation scripts into the existing operating system, a user can install, from one CD and with one installation procedure, the new platform specific kernel or any of the previously existing kernels.

It will be appreciated that, although a specific embodiment of the present invention has been described herein for purposes of illustration, various modifications may be made without departing from the spirit and scope of the invention. For example, while the preferred embodiment described herein installs a new platform specific kernel from the CD-ROM drive 107, those of ordinary skill will understand that any install media can be used.

We claim:

1. A method, executed under the control of an existing operating system kernel running on a computer, for rebooting the computer and invoking a new computer specific kernel, the method comprising the steps of:

determining a computer architecture type of the computer;

accessing a first file with references to at least one file comprising the new computer specific kernel, the at least one file being associated with a computer architecture type on which to install the new computer specific kernel;

comparing the determined computer architecture type with the computer architecture type associated with the at least one file;

installing onto the computer the at least one file comprising the new computer specific kernel when the computer architecture type associated with the at least one files matches the determined computer architecture type of the computer; and in response to the installation, rebooting the computer from the new computer specific kernel.

2. The method of claim 1 wherein the step of determining the computer architecture type of the computer includes the steps of:

retrieving a computer name from a storage area on the computer;

accessing a table which maps computer names to a corresponding computer architecture type;

comparing the retrieved computer name with the computer names in the table; and setting the architecture type of the computer to the architecture type corresponding to the matching computer name in the table.

3. The method of claim 2 wherein the storage area is a programmable-read-only memory (PROM) area and the computer architecture type is stored in an address space associated with the existing operating system kernel.

4. The method of claim 1 wherein the step of accessing the first file with references to files comprising the new computer specific kernel, further comprises the steps of:

retrieving a second file which includes one or more entries, each entry being in either a standard format or a modified format, the modified format including a test program, a test argument, and file information, the file information including handles to at least one file comprising the new computer specific kernel;

for at least one entry, determining the format of the entry;

when the entry is determined to be in the standard format, storing the information into the first file;

when the entry is determined to be in the modified format, invoking the test program on the test argument; and determining whether the test program returns a predetermined value;

when the test program returns the predetermined value, converting a portion of the file information to the standard format; and storing the converted file information in the first file.

5. A method, executed under the control of an existing operating system kernel running on a computer, for rebooting the computer and invoking a new computer specific kernel, the method comprising the steps of:

determining a computer architecture type for the computer;

accessing a first file which includes one or more entries, each entry being in either a standard format or a modified format, the modified format including a test program, a test argument, and file information, the file information including handles to at least one file comprising the computer specific kernel, the file information also including the computer architecture type of the computer onto which the files should be installed;

for at least one entry, determining if the entry is in the standard format;

writing the entry to a second file when the entry is determined to be in the standard format;

when the entry is determined to be in the modified format, invoking the test program on the test argument;

determining whether the test program returns a predetermined value; and rewriting the file information in the standard format and storing the rewritten file information in the second file when the test program returns the predetermined value;

retrieving the computer architecture type associated with the entries in the second file;

comparing the retrieved computer architecture type with the determined computer architecture type;

installing the files comprising the new computer specific kernel, using the file handles, when the computer architecture types match; and rebooting the computer from the installed new computer specific kernel.

6. A system executing under an existing operating system kernel configured to reboot a computer using a new computer specific kernel, the system comprising:

mechanism configured to determine a computer architecture type for the computer;

mechanism configured to access a first file which includes at least one entry, the at least one entry being in either a standard format or a modified format, the modified format including a test program, a test argument, and file information, the file information including handles to at least one file comprising the new computer specific kernel, the file information also including the computer architecture type of the computer onto which the files should be installed;

responsive to providing the first file, mechanism configured to determine if the entry is in the standard format;

mechanism configured to write the entry to a second file when the entry is determined to be in the standard format;

when the entry is determined to be in the modified format, mechanism configured to invoke the test program on the test argument;

mechanism configured to determine whether the test program returns a predetermined value; and mechanism configured to rewrite the file information in the standard format and store the rewritten file information in the second file when the test program returns the predetermined value;

mechanism configured to retrieve the computer architecture type from the entries in the second file;

mechanism configured to compare the retrieved computer architecture type with the determined computer architecture type;

mechanism configured to install the files comprising the new computer specific kernel, using the file handles, when the computer architecture types match; and mechanism configured to reboot the computer from the installed new computer specific kernel.

7. A system executing under an existing operating system kernel configured to reboot a computer using a new computer specific kernel, the system comprising:

mechanism configured to determine a computer architecture type for the new computer;

mechanism configured to access a first file having references to at least one file comprising the new computer specific kernel, the at least one file being associated with the computer in architecture type on which to install the new computer specific kernel;

mechanism configured to retrieve the computer architecture type associated with references in the first file;

mechanism configured to compare the retrieved computer architecture type with the determined computer architecture type;

mechanism configured to install onto the computer the at least one file comprising the new computer specific kernel, when the computer architecture types match; and in response to the installation, mechanism configured to reboot the computer from the new computer specific kernel.

8. The system of claim 7 wherein the mechanism configured to determine the computer architecture type of the computer includes:
mechanism configured to retrieve a computer name from a storage area on the computer;
mechanism configured to access a table which maps the computer name to a corresponding computer architecture type;
mechanism configured to compare the retrieved computer name with the computer names in the table; and
mechanism configured to set the architecture type of the computer to the architecture type corresponding to the matching computer name in the table.

9. The system of claim 8 wherein the storage area is a programmable-read-only memory (PROM) area and the computer architecture type is stored in an address space associated with the existing operating system kernel.

10. The system of claim 7 wherein the mechanism configured to access the first file, further comprises:
mechanism configured to retrieve a second file which includes one or more entries, each entry being in either a standard format or a modified format, the modified format including a test program, a test argument, and file information, the file information including handles to at least one file comprising the new computer specific kernel;
for each entry,
mechanism configured to determine if the entry is in the modified format;
when the entry is determined to be in the modified format,
mechanism configured to invoke the test program on the test argument;
mechanism configured to determine whether the test program returns a predetermined value;
when the test program returns the predetermined value,
mechanism configured to convert the file information to the standard format; and
mechanism configured to store the converted file information in the first file.

11. The system in claim 7 having a client computer system, a server computer system and a communication connection coupled between the client and server computer systems which enables the client and server computer systems to communicate, wherein the system for installing a new computer specific kernel executes on the server computer system and the client computer system receives a new computer specific kernel tailored to the characteristics of the client computer system.

12. The system in claim 7 having a client computer system, a server computer system and a communication connection coupled between the client and server computer systems which enables the client and server computer systems to communicate, wherein the first file and the files comprising the new computer specific kernel resides on the server computer system and the client computer system receives a new computer specific kernel tailored to the characteristics of the client computer system.

13. A computer program product comprising:
a computer usable medium having computer readable code embodied therein which executes under an existing operating system kernel and causes a computer to reboot using a new computer specific kernel, the computer program product comprising:
code configured to determine a computer architecture type for the new computer;
code configured to access a first file having references to at least one file comprising the new computer specific kernel and information regarding a computer architecture type on which to install the new computer specific kernel;
code configured to retrieve the computer architecture type associated with references in the first file;
code configured to compare the retrieved computer architecture type with the determined computer architecture type;
code configured to install onto the computer the files comprising the new computer specific kernel, when the computer architecture types match; and
in response to the installation, code configured to reboot the computer from the new computer specific kernel.

14. The computer program product of claim 13 wherein the code configured to determine the computer architecture type of the computer includes:
code configured to retrieve a computer name from a storage area on the computer;
code configured to access a table which maps the computer name to a corresponding computer architecture type;
code configured to compare the retrieved computer name with the computer names in the table; and
code configured to set the architecture type of the computer to the architecture type corresponding to the matching computer name in the table.

15. The computer program product of claim 14 wherein the storage area is a programmable-read-only memory (PROM) area and the computer architecture type is stored in an address space associated with the existing operating system kernel.

16. A computer program product comprising:
a computer usable medium having computer readable code embodied therein for rebooting a computer using a new computer specific kernel, the computer program product comprising:
code configured to determine a computer architecture type for the computer;
code configured to access a first file which includes at least one entry, the at least one entry being in either a standard format or a modified format, the modified format including a test program, a test argument, and file information, the file information including handles to at least one file comprising the new computer specific kernel, the file information also including the computer architecture type of the computer onto which the files should be installed;
responsive to accessing the first file,
code configured to determine if the entry is in the standard format;
code configured to write the entry to a second file when the entry is determined to be in the standard format;

when the entry is determined to be in the modified format,
- code configured to invoke the test program on the test argument;
- code configured to determine whether the test program returns a predetermined value; and
- code configured to rewrite the file information in the standard format and store the rewritten file information in the second file when the test program returns the predetermined value;

code configured to retrieve the computer architecture type from the entries in the second file;

code configured to compare the retrieved computer architecture type of each entry with the determined computer architecture type;

code configured to install the files comprising the new computer specific kernel when the computer architecture types match; and code configured to reboot the new computer from the installed new computer specific kernel.

* * * * *